United States Patent [19]

McWhirter, deceased

[11] 4,092,761
[45] * June 6, 1978

[54] METHOD AND APPARATUS FOR ELECTRONICALLY RELAXING POULTRY

[75] Inventor: Garland G. McWhirter, deceased, late of Kansas City, Mo., by Nell J. McWhirter, surviving spouse

[73] Assignee: Jerry McWhirter, Kansas City, Mo.

[ * ] Notice: The portion of the term of this patent subsequent to Dec. 31, 1991, has been disclaimed.

[21] Appl. No.: 646,357

[22] Filed: Jan. 2, 1976

Related U.S. Application Data

[63] Continuation of Ser. No. 429,867, Jan. 2, 1974, abandoned.

[51] Int. Cl.² .............................................. A22B 3/00
[52] U.S. Cl. ........................................ 17/1 E; 17/11; 17/45
[58] Field of Search .............................. 17/1 E, 11, 45

[56] References Cited

U.S. PATENT DOCUMENTS 3,474,490  10/1969  Groover et al. ..................... 17/1 E
3,857,138  12/1974  McWhirter ............................ 17/11

Primary Examiner—Robert Peshock
Attorney, Agent, or Firm—Fishburn, Gold & Litman

[57] ABSTRACT

A method and apparatus using an electric shock to relax and stabilize poultry as they move along a defined path in a poultry processing plant wherein the poultry is shocked and then subjected to processing and then shocked again for further relaxation. The apparatus includes a frame structure with electrodes mounted thereon in spaced apart relation and having an electric power supply connected to the electrodes to apply an electric potential difference therebetween. Conveying members carry poultry, that are to be processed, through the shocking devices wherein the poultry engages the electrodes in each device and forms a conductive path therebetween so that an electric current from the power supply passes through the poultry to shock and relax them. Non-conductor shields and insulating structure prevent current from passing through the conveying system to other areas of the processing plants and further protects persons from contact with the electrodes.

11 Claims, 6 Drawing Figures

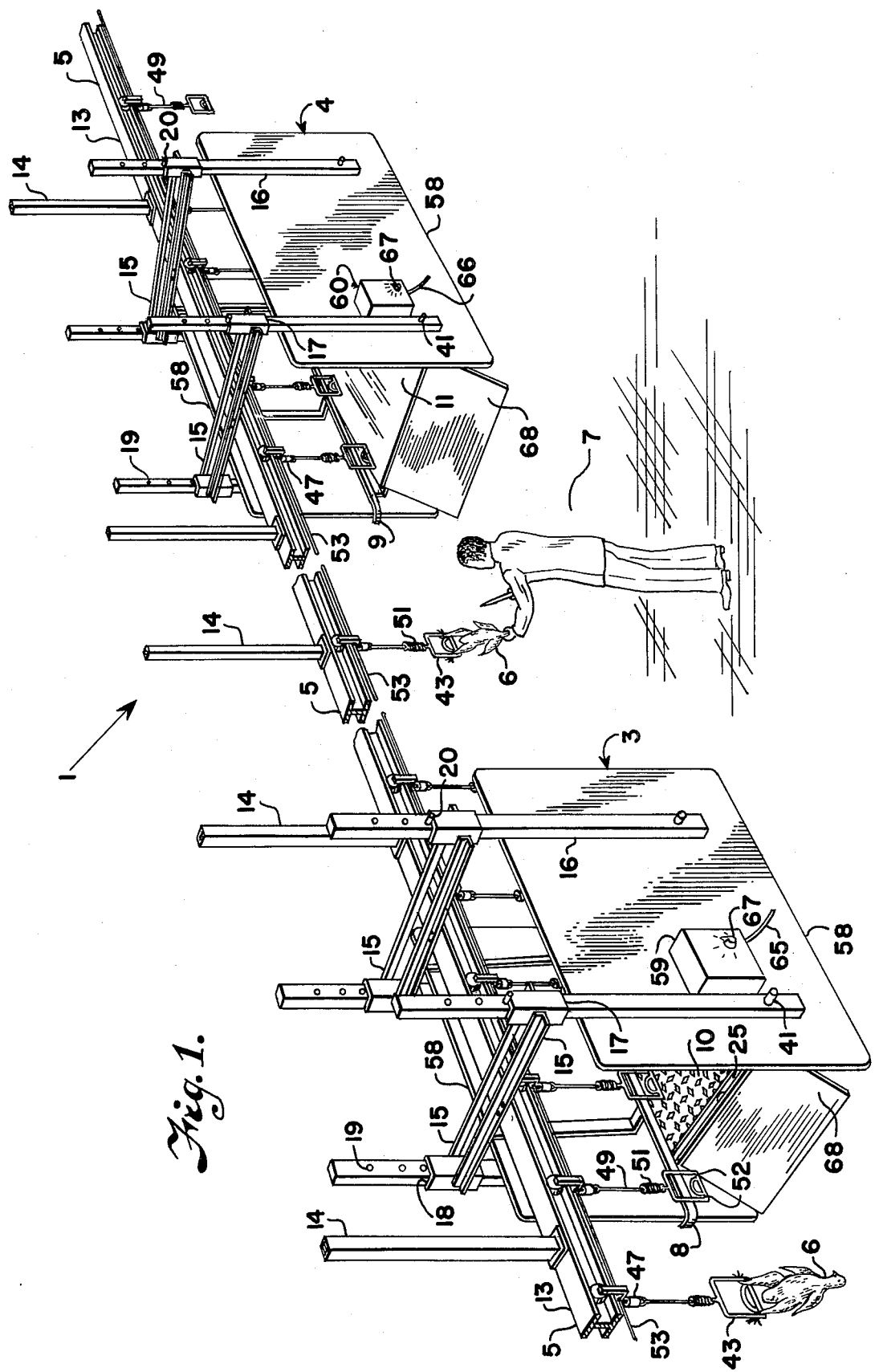

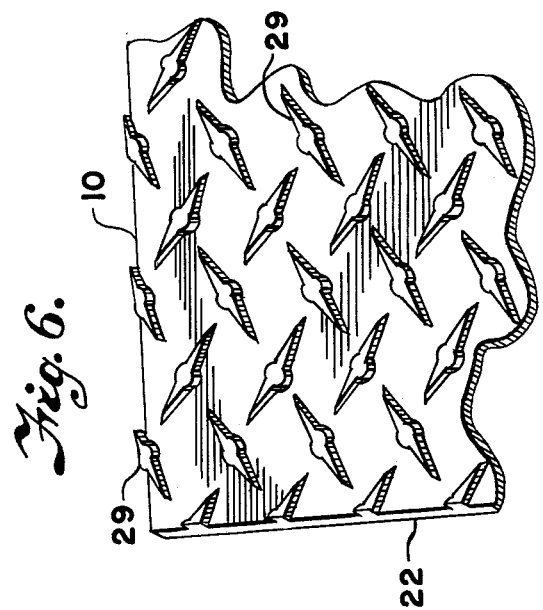
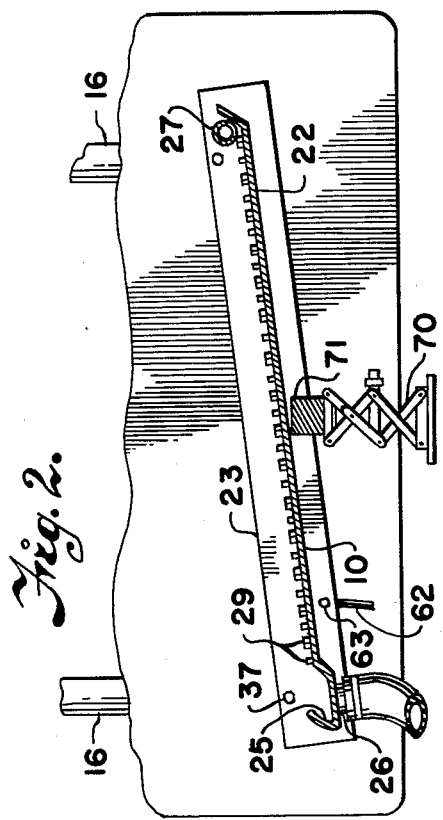
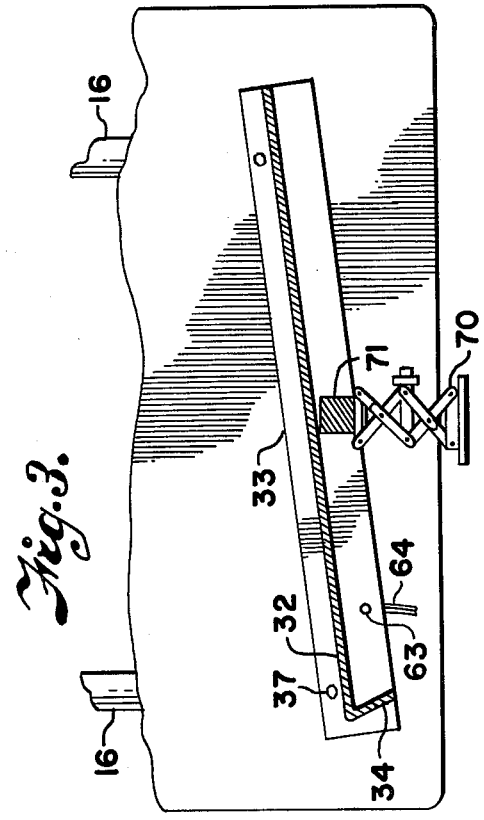

METHOD AND APPARATUS FOR ELECTRONICALLY RELAXING POULTRY

This is a continuation of application Ser. No. 429,867, filed 1/2/74, now abandoned.

BACKGROUND OF THE INVENTION

During the slaughter process of poultry, the poultry and processing equipment may be damaged by fighting, struggling and excessive movement of frightened poultry. Attempts have been made in the past to relax poultry during the slaughter process by shocking same but such attempts have been plagued with difficulties. Some shocking devices have used high voltage for shocking poultry sufficiently so that same remain stunned during subsequent processing steps. Such high voltage can cause inadequate of incomplete bleeding of the poultry because of inadequate relaxation and slowing of the heart. Low voltage shocking devices have been used but have not stunned the poultry sufficiently wherein it can revive before subsequent processing operations are performed. Other difficulties include machinery or shocking devices that will not meet present sanitary standards and safety standards, do not adequately relax all the poultry, are not humane and do not provide safe operator work areas, etc.

OBJECTS OF THE INVENTION

The principal objects of the present invention are: to provide a method of relaxing poultry as they are being processed which includes an initial relaxing shock then a processing operation which in turn are followed by a second relaxing shock; to provide an apparatus for carrying out the method wherein the apparatus and method eliminates the above mentioned difficulties; to provide such an apparatus that may be added in line to existing slaughter equipment in a processing plant; to provide such an apparatus with a pair of shocking devices each having electrodes to electrically contact the poultry to supply electric current thereto wherein the electrodes are shaped to have a minimum of build-up of waste matter that is produced during the slaughter process; to provide such an apparatus with spaced apart shocking devices having a working area therebetween for an operator to work between the shocking devices; to provide such an apparatus with means to adjust the electrical current supplied to the shocking devices so as to achieve maximum relaxation of the poultry; to provide such an apparatus which is adapted for relaxing poultry with a low voltage current; to provide such an apparatus which is adjustable in the spacing between the electrodes to accommodate different sizes of poultry; to provide such an apparatus with shields to prevent accidental shocking of operators and with insulators to prevent electrical current from passing to the conveyors into other areas of the processing plant; to provide such an apparatus which is adapted to use both wet and dry lower disposed electrodes in the shocking devices; to provide such an apparatus which is simple in construction, economical to manufacture and maintain, that is safe and sanitary to use and well adapted for its intended use.

Other objects and advantages of the present invention will become apparent from the following description taken in connection with the accompanying drawings wherein are set forth by way of illustration and example certain embodiments of this invention.

DESCRIPTION OF THE DRAWINGS

FIG. 1 is a perspective view of the electronic relaxer and stabilizing apparatus.

FIG. 2 is an enlarged fragmentary view of one of the lower electrodes which is adapted to have a conductive liquid flow thereover.

FIG. 3 is an enlarged fragmentary view of another lower electrode which is adapted to have a dry surface for contact with the poultry.

FIG. 6 is an enlarged view of a fragment of a lower electrode to show structural details of protuberances thereon.

Figure 5:
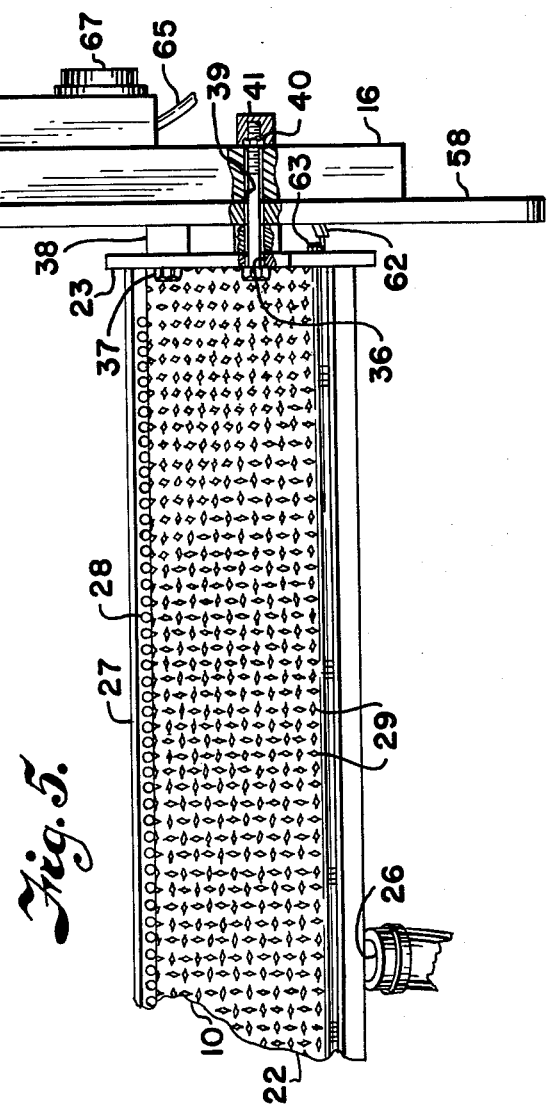
FIG. 5 is an enlarged view of the connection of the lower electrodes to the frame work with portions broken away to show structural details thereof.
Figure 4:
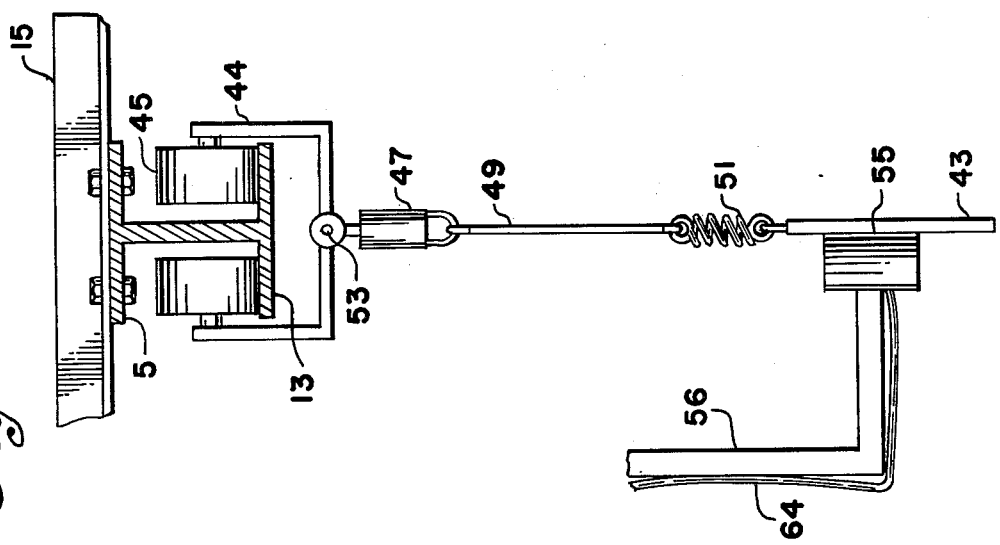
FIG. 4 is an enlarged view of the conveying means showing structural details thereof.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

DESCRIPTION OF THE PREFERRED EMBODIMENTS

The reference numeral 1 designates generally an electronic stunning apparatus used in the slaughter process of poultry wherein the apparatus uses an electric current to shock the poultry for relaxing it. The apparatus 1 includes two shocking devices 3 and 4 that are suitably supported in spaced apart relation adjacent to poultry conveying means 5 and are operable to electrically contact portions of the poultry 6 as they move through each of the shocking devices 3 and 4. A work area 7 is provided between the shocking devices 3 and 4 to accommodate means for performing a processing operation on the poultry. Each of the shocking devices 3 and 4 is provided with upper electrodes 8 and 9 respectively and lower electrodes 10 and 11 respectively with the lower electrodes being spaced below the upper electrodes a distance for contact by portions of the poultry as they move thereby along the conveying means 5. The poultry 6 is suitably suspended head down from the conveying means 5 and when it comes into electrical contact with the electrodes 8 and 10 in the shocking device 3 and the electrodes 9 and 11 in the shocking device 4 an electrically conductive path is formed between the respective electrodes by the poultry 6 whereby the electric current passes through the poultry to shock it. A first shock is supplied by the shocking device 3 after which a processing operation is performed on the poultry 6 and after the processing operation a second shock is applied by the shocking device 4.

The conveying means 5 is of generally standard construction and as illustrated includes a conveying track 13 such as an I-beam which is supported in spaced relation from the floor of the processing plant by any suitable means and defines a path of movement for the poultry 6. As illustrated the conveying track 13 has suspending members 14 secured thereto and that are also secured to a wall or ceiling of the processing plant for suspending the conveying track 13. Beam members 15 are secured to the conveying track 13 in any suitable manner and are in spaced apart relation along the track 13 and extend laterally from both sides thereof. A support post 16 is suitably mounted at each end of the beam 15 and depends downwardly therefrom. The lower electrodes 10 and 11 are each suitably supported at the lower ends of the support posts 16 with the same being preferably of a non-conductive and non-moisture absorbing material. The beams 15 are preferably structural members and in the illustrated structure include angle iron members secured to the conveying track 13 and extend laterally therefrom. A support post mounting member 17 is secured to each end of the beams 15 and provides for the support posts 16 to be movably received therein for up and down movement to vary the spacing between the track 13 and the lower electrodes 10 and 11.

As illustrated each of the mounting members 17 have an opening 18 therethrough that are suitably shaped for receiving a respective support post 16. Means are provided for holding the posts 16 in a selected position and as illustrated one means for holding same is provided by having a plurality of apertures 19 through each of the posts 16 adjacent an upper end thereof. A suitable stop member 20 is placed in the desired aperture 19 and upon engagement with the upper edge of respective member 17 the posts 16 and the respective lower electrodes 10 and 11 are held in the selected position.

The lower electrodes 10 and 11 may be of any suitable type and as illustrated the major difference between the shocking devices 3 and 4 is the type of lower electrode used. Preferably each of the lower electrodes 10 and 11 are made of a conductive and corrosion resistant material such as aluminum and have upwardly facing surfaces sloping downwardly to facilitate drainage of matter and waste material therefrom. As shown the lower electrode 10 is adapted to have a conductive liquid such as water flowing thereover and is comprised of a flat sheet portion 22 with upstanding ribs or members 23 secured to edges thereof to provide a channel type structure for the conductive liquid to flow in. The ribs 23 are on the edges of the sheet 22 and extend longitudinally along the conveying means 5. Preferably the electrode 10 slopes upwardly in the direction of movement of the poultry along the conveying means 5. The leading edge or lower disposed end of the electrode 10 is provided with drain means for collecting the conductive liquid from across the width of the electrode 10 wherein a channel 25 is formed across the lower end of the electrode 10 and collects liquid across the width of the electrode 10 providing a passage for same to a drain member 26 which has means associated therewith for connecting same to a sewage drain. Adjacent to the raised end of the electrode 10 means are provided preferably for continuously supplying the conductive liquid to the electrode 10 wherein the conductive liquid flows substantially the length of the lower electrode 10 and across the width thereof. As illustrated a pipe member 26 extends across the width of the electrode 10 and has a plurality of apertures 28 therein for providing a plurality of streams of conductive liquid onto the electrode 10. The pipe 27 is connected to a source of conductive liquid such as a water supply system (not shown) preferably for a continuous supply of fresh conductive liquid. Preferably the depth of the conductive liquid is one-eighth inch or less. To help maintain uniform flow of liquid down the electrode 10 the upper disposed surface of the same is provided with a plurality of protuberances 29 to deflect and divide the conductive liquid to help assure that the conductive liquid is uniform in depth and covers the width of the electrode 10 as it flows down the electrode 10. Preferably the protuberances 29 have a height of approximately one-eighth inch. Tread plate has been found to be particularly useful in the construction of the lower electrode 10.

The lower electrode 11 also has an upwardly facing surface sloping downwardly to facilitate drainage of waste materials therefrom. Similar to the lower electrode 10 the electrode 11 is inclined upwardly in the direction of movement of the poultry along the conveying means 5. Any form of electrode 11 can be used and as illustrated it is comprised of a flat sheet member 32 having upstanding ribs or flanges 33 suitably secured to opposite edges thereof wherein the ribs extend generally longitudinally along the conveying means 5. As shown the electrode 11 is provided with a flange portion 34 extending across the electrode 11 depending therefrom for eliminating a sharp leading edge.

The lower electrodes 10 and 11 are secured to the support posts 16 in any suitable manner for supporting same from the conveying track 13. As illustrated the ribs 23 and 33 are each provided with through apertures 36 for receiving securing devices 37 such as bolts therethrough and having spacers 38 positioned between the ribs 23 and 33 and the respective posts 16. The securing devices 37 extend through apertures 39 through the post 16 wherein a nut 40 is in engagement with each of the securing devices 37 to secure the electrodes 10 and 11 to the posts 16. The exposed portions of the securing devices 37 are protected from accidental contact by suitable nonconductive members or insulators 41 which are suitably secured to the securing devices 37. As illustrated the insulators 41 are in threaded engagement with the shanks of the securing devices 37 and enclose the nuts 40 therein.

The conveying means 5 includes shackles 43 which are supported from the track 13 and as illustrated are suspended therefrom. The shackles 43 are movable along the track 13 and preferably are electrically insulated therefrom to electrically isolate same from the rest of the processing equipment. Insulating and suspension is accomplished in the form shown by having the shackles 43 each connected to a supporting bracket or trolley 44 which has wheel members 45 rotatably mounted thereon that engage the upper surface of opposite flange portions of the I-beam shaped conveying track 13. The shackles 43 are each suitably suspended from a respective support bracket 44 by an electrically nonconductive hanger 47. A link 49 engages the hanger 47 and has a spring member 51 mounted on the lower end thereof with the shackle 43 suspended from the spring member 51. The shackle 43 is suspended from the spring member 51. The shackles 43 are of generally standard construction that are of the type normally used in processing plants and are made of a corrosion resistant electrically conductive material such as stainless steel. In the illustrated structure the shackles 43 each have two slots 52 for receiving the legs of the poultry 6 wherein the slots 52 are shaped and sized to prevent the toes of the birds from moving therethrough so as to suspend the poultry therefrom with the head of each hanging downwardly. The conveying means 5 includes a member such as a flexible cable or chain 53 connected to a driving structure (not shown) to move in the defined path. The trolleys 44 are suitably attached to the conveyor cable or chain 53 and are moved thereby through the shocking devices 3 and 4 along the conveying track 13. The defined path of movement of the poultry 6 extends generally centrally through each of the shocking devices 3 and 4.

The upper electrodes 8 and 9 in the illustrated structure are similar in operation and construction wherein like numbers designate like or similar parts or structure. As illustrated the upper electrodes 8 and 9 include conductive guide rails which are suitably supported so the respective lower electrodes 10 and 11 can be adjusted relative to the conveying track 13 without moving the upper electrodes 8 and 9. The upper electrodes 8 and 9 are shown as extending the length of the respective shocking devices 3 and 4 and are positioned adjacent to the path of movement of the shackles 43 wherein the electrodes 8 and 9 have a face 55 generally parallel to the path of movement. The electrodes 8 and 9 are suspended by having support brackets 56 secured to the beams 15 depending therefrom and having the respective electrode 8 or 9 secured thereto wherein it is electrically insulated from the support brackets 56. The support brackets 56 are shaped and positioned for the electrodes 8 and 9 to have electrical contact with the shackles 43 throughout the length of the respective shocking devices 3 and 4. Electrical contact between the electrodes 8 and 9 and the shackles 43 is assured by the face 55 of the rail being positioned past the center of the shackle path when hanging freely thereby urging the shackles 43 off center slightly so that the weight thereof and/or the poultry 6 maintains engagement and electrical contact between the electrodes 8 and 9 and the shackles 43. It is to be noted that the electrodes 8 and 9 can have selected areas insulated from the shackles 43 such as by having a covering of insulating material in selected areas on the face 55 along the length thereof so as to control the length of time and or the number of electrical contacts between the shackles 43 and the electrodes 8 and 9 for a purpose later described.

Means are provided on each of the shocking devices 3 and 4 to help prevent plant operating personnel from accidentally contacting the electrodes 3 and 4 and being shocked thereby. As illustrated the means include opposed shield panel members 58 suitably secured to respective support posts 16 between the spacers 38 and the inner-disposed surfaces of the posts 16. The shields 58 extend beneath the lower electrodes 10 and 11 and beyond the end of the electrodes 10 and 11. Preferably the shields 58 are of a nonmoisture absorbing and electrically nonconductive material so as to prevent the formation of an electrical path. The shields 58 prevent contact with the electrodes from the side of the shocking devices 3 and 4 and by extending below the electrodes and beyond the end thereof prevent accidental contact with the electrodes such as when cleaning of the processing plant.

The electrodes 8 and 10 in the shocking device 3 and the electrodes 9 and 11 in the shocking device 4 are electrically connected to the power supplies 59 and 60 respectively so as to provide an electric potential difference or charge therebetween for shocking or stunning the poultry 6. The power supply 59 and 60 are similar in construction with each being connected to the respective electrodes in a similar manner. As illustrated one lead 62 from the power supply is connected to the electrode 10 by a suitable fastener 63 such as a screw holding the lead 62 in electrical contact with the electrode 10. As shown the lead 62 is electrically connected to one of the ribs 33 which is a conductive member, and which is electrically connected to the sheet 32. The other lead 64 from the power supply is suitably electrically connected to the electrode 8. The power supply 59 and 60 are each connected to the electrical power source existing in the processing plant such as by conductors 65 and 66 respectively. Preferably, the electric potential difference supplied to the electrodes is unidirectional or direct current which can be produced by rectifying alternating current from the power source. Each of the power supplies 59 and 60 is provided with means such as a rheostat 67 for adjusting the amount of the electric potential difference between the upper and lower electrode.

As illustrated each of the shocking devices 3 and 4 is provided with a lead in ramp 68 which is suitably secured to and supported by the respective shocking device and inclined upwardly toward the respective lower electrode and extends between the opposed respective panel members 58. The ramps 68 prevent the head and neck area of the poultry 6 from engaging the leading edges of the lower electrodes 10 and 11. Preferably the ramps 68 are made of a smooth nonconductive, nonmoisture absorbing material.

As described above the shocking devices 3 and 4 are adjustable so as to adjust the spacing between the upper and lower electrodes to accommodate different lengths of birds. As best seen in FIGS. 2 and 3 extendable means such as a jack 70 can be provided under each of the lower electrodes 10 and 11 for raising and lowering same and supporting same from the floor of the processing plant wherein the stop members 20 need not be used to suspend the support posts 16 from the respective beams 15. As illustrated a nonconductive member 71 extends between and is secured to the flanges 23 of the electrode 10 and extends between and is secured to the flanges 33 of the electrode 11. The jacks 70 engage respective members 71 for supporting the respective electrodes 10 and 11.

The shocking devices 3 and 4 are spaced apart along the length of the conveying means 5 providing an operator working area therebetween. As for example the shocking devices can be placed approximately thirty feet apart. An operator can position himself between the two shocking devices for jugulating the poultry as they move thereby, or a machine suitable for jugulating the poultry can be provided in the work area 7.

The shocking devices 3 and 4 are spaced apart along the length of the conveying means 5 providing an operator working area therebetween. As for example the shocking devices can be placed approximately thirty feet apart. An operator can position himself between the two shocking devices for jugulating the poultry as they move thereby, or a machine suitable for jugulating the poultry can be provided in the work area 7.

The present invention is more fully understood by a description of the method of operation thereof. The spacing between the upper and lower electrodes is suitably adjusted to the particular size of poultry being processed. The conveyor is operated so that the shackles 43 move along the conveying track 13. The power supplies 59 and 60 are then activated to supply the electric potential difference between the upper and lower electrodes of each of the shocking devices 3 and 4. Preferably a low voltage in the range of 70 to 150 volts D.C. is applied across the electrodes 8 and 10 of the shocking device 3 and a voltage of approximately 45 volts D.C. is applied across the electrodes 9 and 11 of the shocking device 4. The use of excessive voltage can slow the heart of the poultry resulting in inadequate bleeding with a decrease in product quality and too low voltage can result in the poultry reviving with resulting fighting and possible equipment and poultry damage. The use of two shocks, one before jugulating and one after assures that the poultry will be relaxed for easy handling by the operator for jugulating and improves bleeding after jugulating while relaxing and stunning same before entering other processing equipment. The use of a conductive liquid improves electrical contact with the electrode 10 and maintains a clean and sanitary structure and blood after jugulating helps improve electrical contact with the electrode 11. Upstream of the shocking device 3 poultry 6 are suspended from the shackles 43 by placing their legs in the slots 52 with the poultry being in a head down position. The shackles 43 move along the conveying track 13 through the shocking device 3 wherein the head and/or neck area of the poultry contact the lower electrode 10 contacting both the sheet 22 and conductive liquid flowing thereover. As the poultry contacts the lower electrode 10 it completes a circuit between the upper electrode 8 and the lower electrode 10 whereby current from the power supply 59 passes through the poultry to shock and relax same. Upon being shocked the poultry will sometimes defecate wherein the waste material will fall onto the lower electrode 10 and be carried to the drain by the conductive liquid. The use of a liquid flowing over the lower electrode 10 provides improved electrical contact between the poultry and the sheet 22 by wetting portions of the head and neck area of the poultry and also helps to maintain the lower electrode 10 in a clean and sanitary condition by having a continuous supply of fresh liquid flowing thereover. The depth of the conductive liquid is maintained at approximately one-eighth inch or less so as to prevent the poultry from inhaling the conductive liquid when same are being shocked. Upon entering either of the shocking devices 3 or 4 the shackles 43 move into engagement with the respective upper electrodes 8 and 9 which are illustrated as having an arcuate or curved end to help align shackles 43 whereby the poultry 6 are facing in a common direction generally normal to the direction of movement. After passing through the first shocking device 3 the poultry 6 passes into the work area 7 in a stunned and relaxed condition. Such condition facilitates an operator in grasping the poultry as they move by him so that he can jugulate same to kill the poultry and start the bleeding process. Sufficient room is provided between the shocking devices 3 and 4 to allow the operator sufficient area to move about and reduce the possibility of missing some of the poultry 6. After jugulating and passing through the work area 7 the poultry 6 enters the shocking device 4 and completes a circuit between the upper electrode 9 and the lower electrode 11 and are shocked a second time by current from the power supply 60. Preferably the lower electrode 11 is dry wherein the blood from the poultry 6 helps make electrical contact between the poultry 6 and the lower electrode 11, the blood being a conductor enhances or improves the electrical contact therebetween. The relaxation due to the second shock helps improve the bleeding of the bird after jugulating and also further stuns and relaxes him to prevent struggling as he passes into other areas of the processing plant. The relaxation of the poultry 6 from the first shock and the second shock allows the use of low voltage for improved bleeding and substantially reduces their propensity to fight, struggle and to make sudden movements that often result in damage to the machinery also decreases the possibility of broken bone.

The use of a shock before jugulating and a shock after jugulating allows waste materials to be disposed of in the shocking device 3 and the blood after jugulating to be drained onto the floor of the processing plant or into suitable collecting means for collection and further processing. With the lower electrodes 10 and 11 being inclined any waste material or blood will tend to flow down same preventing a buildup thereon.

It is to be understood that while I have illustrated and described certain forms of my invention it is not to be limited to the specific form or arrangement of parts herein described and shown.

I claim:

1. Apparatus for electrically shocking poultry in a poultry processing operation, said apparatus comprising:
   (a) a poultry conveyor having a plurality of poultry supporting shackles spaced therealong and movable in a defined path, said shackles engaging legs of poultry to support same head down;
   (b) a first shocking device positioned in said path along said conveyor, said first shocking device having upper and lower electrodes positioned in said path for electrical engagement with portions of said poultry as same moves thereby, said engagement being an electrical circuit making contact, said lower electrode being a laterally extending member having an inclined upper surface and an upper edge portion and a lower edge portion
   (c) means on said lower electrode defining a channel extending between the upper edge portion and the lower edge portion thereof;
   (d) means on said lower electrode and means extending along the upper edge portion of said lower electrode and operatively connected to a source of conductive liquid to provide a flow of liquid between the upper edge portion and the lower edge portion and having a substantially uniform depth across the channel;
   (e) means including portions defining a liquid collecting channel extending along the lower edge portion of said lower electrode for collecting used liquid and poultry waste across the width of the channel for disposal of the liquid and waste;
   (f) a jugulating area positioned in said path along said conveyor and spaced from said upper edge portion of said lower electrode;
   (g) a second shocking device positioned in said path along said conveyor and having said jugulating area between said first and second shocking devices, said second shocking device having upper and lower electrodes positioned in said path for engagement with portions of said poultry as same moves thereby, said engagement being an electrical circuit making contact; and
   (h) means electrically connected to said upper and lower electrodes of said first and second shocking devices for applying a first electrical potential difference to said upper and lower electrodes of said first shocking device and a second electrical potential difference to said upper and lower electrodes of said second shocking device whereby poultry moving along said path complete an electrical circuit between the electrodes in each of said first and second shocking devices and the poultry is shocked a first time in said first shocking device before moving into the jugulating area to stun and maintain the poultry in a stunned condition and the poultry is shocked a second time in said second shocking device with a lesser electrical potential difference after jugulation is performed on the poultry, said second shock being of a voltage to facilitate bleeding of the poultry.

2. Apparatus for electrically shocking poultry as set forth in claim 1 wherein:
   (a) said conveyor includes a track;
   (b) said shackles each include:
      (1) a trolley having wheels in engaagement with said track;
      (2) an electrically non-conductive hanger depending from said trolley; and
      (3) a shackle portion depending from said electrically non-conductive hanger; and
   (c) said upper electrode of said first shocking device and said upper electrode of said second shocking device are each positioned to be engaged by the shackle portion whereby said track is electrically isolated from each of said upper electrodes.

3. Apparatus for electrically shocking poultry as set forth in claim 1 wherein:
   (a) said means for applying a first electrical potential difference to said upper and lower electrodes of said first shocking device is operative to apply an electrical potential difference in the range of 70 to 150 volts direct current; and
   (b) siad means for applying a second electrical potential difference to said upper and lower electrodes of said second shocking device is operative to apply an electrical potential difference in the nature of 45 volts direct current.

4. Apparatus for electrically shocking poultry in a poultry processing operation, said apparatus comprising:
   (a) a poultry conveyor having a plurality of poultry supporting shackles spaced therealong and movable in a defined path, said shackles engaging legs of poultry to support same head down;
   (b) a shocking device positioned in said path along said conveyor, said shocking device having upper and lower electrodes positioned in said path for engagement with portions of said poultry as same moves thereby, said engagement being an electrical circuit making contact, said lower electrode being an elongated planar member having opposite side edges and inclined downwardly in a direction opposite to the direction of movement of said poultry thereby defining an upper end edge portion and a lower end edge portion and having an upwardly facing surface with a plurality of protuberances thereon, said protuberances being shaped and positioned to deflect and divide a flow of conductive liquid flowing over the upwardly facing surface and effect a selected depth of the liquid over substantially the entire width of said lower electrode;
   (c) means including an elongated flow member extending along and adjacent the upper edge portion of said lower electrode and operatively connected to a source of conductive liquid, said flow member having a plurality of longitudinally spaced and aligned apertures positioned to provide a plurality of streams of the conductive liquid onto said lower electrode and toward said plurality of protuberances;
   (d) means including portions defining a liquid collecting channel extending along and adjacent the lower edge portion of said lower electrode for collecting used liquid and poultry waste across the width of said lower electrode and a drain member for disposal of the liquid and waste;
   (e) means for applying an electrical potential difference to said upper and lower electrodes of said shocking device whereby poultry moving along said path completes an electric circuit between said upper and lower electrodes and is shocked to facilitate handling of the poultry for jugulating same,
   (f) a second shocking device positioned in said path along said conveyor, said second shocking device having upper and lower electrodes positioned in said path for engagement with portions of poultry as same moves thereby, said engagement being an electrical circuit making contact, said lower electrode being an elongated planar member having opposite end edges and inclined downwardly in a direction opposite to the direction of movement of said poultry, said opposite end edges of said planar member each having an upstanding member secured thereto and each having portions extending above and below said planar member;
   (g) means for applying an electrical potential difference to said upper and lower electrodes of said second shocking device whereby poultry moving along said path completes an electric circuit between said upper and lower electrodes and is shocked a second time to facilitate bleeding and relaxing same before leaving said second shocking device;
   (h) an electrically non-conductive member extending between and secured to said upstanding members of said lower electrode of said second shocking device; and
   (i) extensible means in engagement with said electrically non-conductive member for selectively raising and lowering same to adjust the spacing between said upper and lower electrodes of said second shocking device.

5. Apparatus for electrically shocking poultry as set forth in claim 4 wherein:
   (a) said opposite end edge portions of said planar member each have an upstanding member secured thereto and each having respective portions extending above and below said planar member;
   (b) an electrically non-conductive member extends between and is secured to said upstanding members of said lower electrode of said shocking devide; and
   (c) extensible means are in engagement with said electrically non-conductive member for selectively raising and lowering same to adjust the spacing between said upper and lower electrodes of said shocking device.

6. Apparatus for electrically shocking poultry as set forth in claim 4 including:
   (a) a pair of upstanding members each secured to a respective one of said opposite end edges of said planar member and each having respective portions thereof extending above and below said planar member;
   (b) a second shocking device positioned in said path along said conveyor, said second shocking device having upper and lower electrodes positioned in said path for engagement with portions of poultry as same moves thereby, said engagement being an electrical circuit making contact, said lower electrode being an elongated planar member having opposite end edges and inclined downwardly in a direction opposite to the direction of movement of said poultry, said opposite end edges of said planar member each having an upstanding member secured thereto and each having portions extending above and below said planar member;

(c) a pair of electrically non-conductive members each extending between and secured to said upstanding members of said lower electrode of a respective one of said first named shocking device and said second shocking device; and (d) extensible means for and in engagement with each of said electrically non-conductive members for selectively raising and lowering same to adjust the spacing between said upper and lower electrodes of said respective shocking device.

7. Apparatus for electrically shocking poultry as set forth in claim 6 wherein:

(a) said means for applying an electrical potential difference to said upper and lower electrodes of said first named shocking device is operative to apply an electrical potential difference in the range of 70 to 150 volts direct current; and (b) said means for applying an electrical potential difference to said upper and lower electrodes of said second shocking device is operative to apply an electrical potential difference in the nature of approximately 45 volts direct current.

8. A method for processing poultry, said method including:

(a) moving poultry in a defined path along a conveyor and into engagement with first and second electrodes of a first shocking area;

(b) applying a first electrical potential difference to said first and second electrodes of said first shocking area thereby shocking the poultry a first time;

(c) moving the electrically shocked poultry from the first shocking area to and through a processing area;

(d) jugulating said poultry in the processing area;

(e) moving the jugulated poultry from the processing area into engagement with first and second electrodes of a second shocking area;

(f) applying a second electrical potential difference to said first and second electrodes of said second shocking area thereby shocking the poultry a second time; and (g) moving the poultry through the second shocking area.

9. A method for processing poultry, said method including:

(a) moving poultry in a defined path along a conveyor and into engagement with upper and lower electrodes of a first shocking area;

(b) directing a continuous flow of fresh conductive liquid over the lower electrode;

(c) applying a first electrical potential difference to said upper and lower electrodes of said first shocking area thereby shocking the poultry a first time;

(d) collecting and draining the used conductive liquid and poultry waste from the lower electrode;

(e) moving the electrically shocked poultry from the first shocking area to and through a processing area;

(f) jugulating said poultry in the processing area;

(g) moving the jugulated poultry from the processing area into engagement with upper and lower electrodes of a second shocking area;

(h) applying a second electrical potential difference to said upper and lower electrodes of said second shocking area thereby shocking the poultry a second time; and (i) moving the poultry through the second shocking area.

10. A method for processing poultry as set forth in claim 9 wherein:

(a) said applying a first electrical potential difference to said electrodes of the first shocking area comprises applying an electrical potential difference in the range of 70 to 150 volts direct current; and (b) said applying a second electrical potential difference to said electrodes of the second shocking area comprises applying an electrical potential difference in the nature of approximately 45 volts direct current.

11. Apparatus for electrically shocking poultry in a poultry processing operation, said apparatus comprising:

(a) a poultry conveyor having a plurality of poultry supporting shackles spaced therealong and movable in a defined path, said shackles engaging legs of poultry to support same head down;

(b) a first shocking device positioned in said path along said conveyor, said shocking device having first and second electrodes positioned in said path for engagement with portions of said poultry as same moves thereby, said engagement being an electrical circuit making contact;

(c) means for applying an electrical potential difference to said first and second electrodes of said first shocking device whereby poultry moving along said path completes an electric circuit between said first and second electrodes of said first shocking device and is shocked to facilitate handling of the poultry for jugulating same;

(d) a second shocking device positioned in said path along said conveyor, said second shocking device being spaced along said conveyor from said first shocking device defining a processing area therebetween, jugulating means positioned in said processing area, said second shocking device having first and second electrodes positioned in said path for engagement with portions of poultry as same moves thereby, said engagement being an electrical circuit making contact; and (e) means for applying an electrical potential difference to said first and second electrodes of said shocking device whereby poultry moving along said path completes an electric circuit between said first and second electrodes of said second shocking device and is shocked a second time to facilitate bleeding and relaxing same before leaving said second shocking device.

* * * * *